Figures 1, 2:
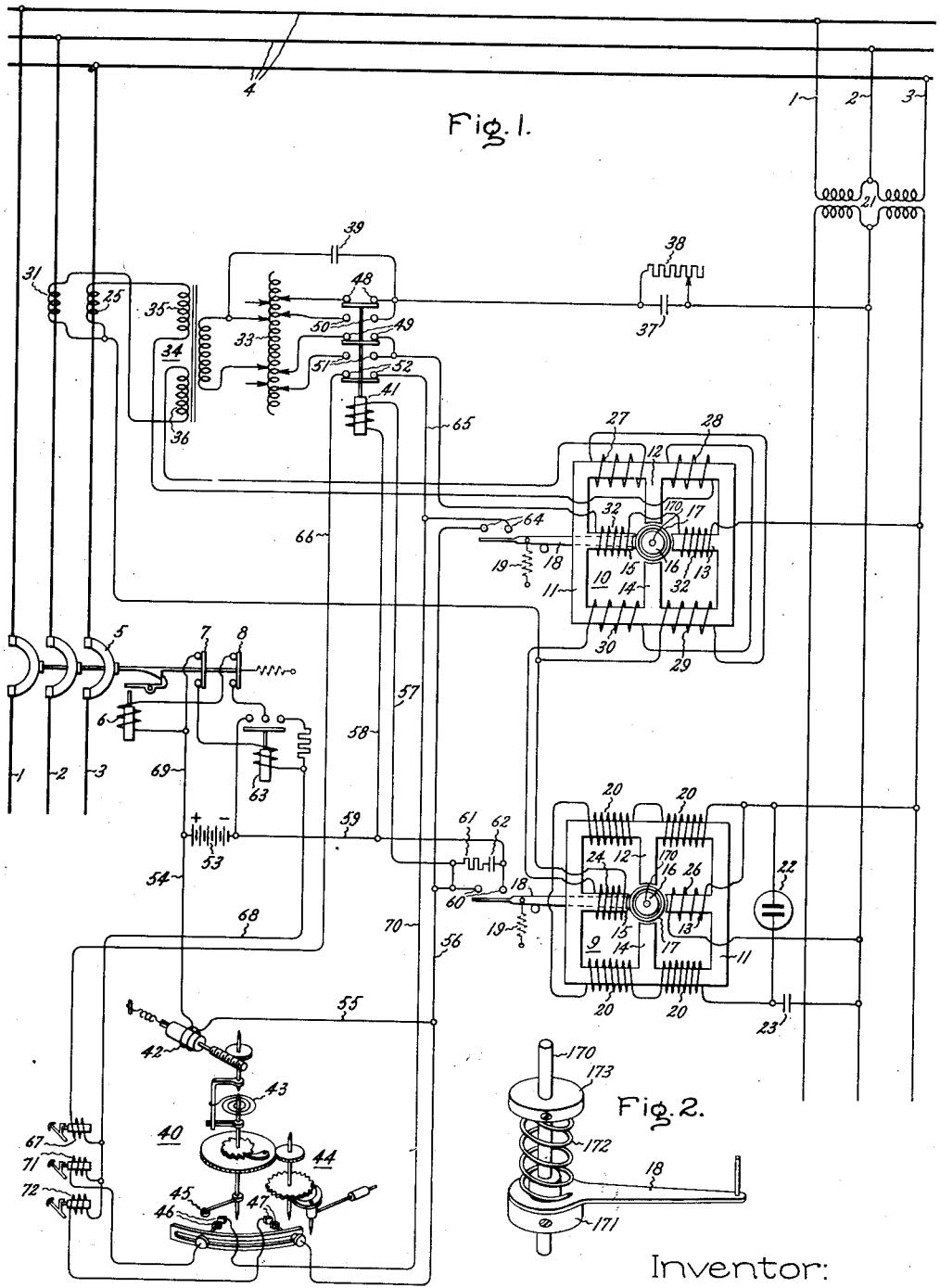

Sept. 27, 1938.　　　O. C. TRAVER　　　2,131,605

PROTECTIVE APPARATUS

Filed Dec. 15, 1936

Inventor:
Oliver C. Traver,
by Harry E. Dunham
His Attorney.

Patented Sept. 27, 1938

2,131,605

UNITED STATES PATENT OFFICE 2,131,605

PROTECTIVE APPARATUS

Oliver C. Traver, Drexel Hill, Pa., assignor to General Electric Company, a corporation of New York Application December 15, 1936, Serial No. 115,970

17 Claims. (Cl. 175—294)

My invention relates to improvements in protective apparatus for alternating current electric systems and more particularly to improvements in protective relays which respond selectively in accordance with the distance between the relays and a fault. One object of my invention is to provide quickly acting, low-burden distance responsive protective apparatus which is highly selective in its response and which has its selectivity substantially unaffected by changes in the frequency of the circuit to be protected. Another object of my invention is to provide distance responsive protective apparatus which can be easily and closely adjusted over a wide range of operating values. A further object of my invention is to provide distance responsive protective apparatus in which the possibility of false action, due to transient conditions arising at the moment a short circuit occurs and when a short circuit is cleared from the circuit to be protected, is substantially eliminated. These and other objects of my invention will appear in more detail hereinafter.

In distance responsive protective relays whose operation is dependent upon the power factor of the circuit, the capacitance used to obtain maximum torque at a desired angle between current and voltage will tend to oscillate with the inductance of the relay coil. Consequently, when the voltage suddenly changes from normal to fault value, the relay potential coil voltage will not go immediately to the fault value because it will tend to require a cycle or so for the surplus energy of the circuit to be dissipated. Since the natural frequency of the potential coil circuit may not be the same as the system frequency and since resonance makes for an exaggerated voltage on the relay until the surplus energy is absorbed, the voltage and the impedance measurement will pass through artificial values until the voltage on the potential coil reaches fault value. These artificial values of impedance measured are apt to be high although they may be lower than the operating point of the relay and in either case may cause false tripping either by mechanical rebound from opening torque or actual closing torque. In accordance with my invention, I prevent oscillations in the relay potential circuit so as to avoid this false operation. Also, with my arrangement, there is the additional advantage of reducing the effect of frequency variation to a minimum. Further in accordance with my invention, I provide a distance relay device whose operation is dependent on the reactance ohms in the circuit as determined externally to the relay itself by means of a voltage balance circuit whose energization is dependent on a current and a voltage derived from the circuit to be protected.

My invention will be better understood from the following description when considered in connection with the accompanying sheet of drawings, and its scope will be pointed out in the appended claims.

In the accompanying drawing, Fig. 1 diagrammatically illustrates protective apparatus embodying my invention, and Fig. 2 illustrates in perspective a detail of the protective apparatus shown in Fig. 1.

In the embodiment of my invention shown in Fig. 1, a polyphase alternating current circuit comprising phase conductors 1, 2, and 3 is arranged to be connected to a polyphase station bus 4 through suitable means shown as a latch-closed circuit breaker 5. This is provided with a trip coil 6 and auxiliary switches 7 and 8, which are arranged to be closed when the circuit breaker is closed, and to be opened when the circuit breaker is opened, for purposes which will hereinafter appear. As is well-known to the art, the circuit 1—2—3 may be continued through other stations to form a sectionalized power system.

In order to control the circuit breaker 5 in accordance with the distance between the polyphase bus 4 and a fault on the occurrence of faults on the circuit 1—2—3, I provide, in accordance with my invention, two distance responsive relay devices 9 and 10, which may be respectively defined as the starting unit and ohm unit, respectively, of a distance relay. As I now conceive my invention, it is not essential that the ohm unit 10 be a metering device in the sense that it has to have a movable member, the magnitude of whose movement or position is dependent on ohms. In other words, movement at the balance point of the quantities which establish the ohmic condition when a fault lies in a given direction from the relay is suitable to the purpose in hand.

In accordance with my invention, the distance responsive relay devices 9 and 10 have different impedance response characteristics in order to obtain a high degree of selectivity. As illustrated in the accompanying drawing, each of the devices or units 9 and 10 may comprise a magnetic core or stator 11 having a plurality of inwardly projecting salients 12, 13, 14, and 15, and suitable energizing windings thereon. Centrally disposed with respect to the inner ends of the salients is a magnetic stator 16 and rotatable in the gaps between the ends of the salients and the stator 16 is an electric current conducting element 17 such as a cylindrical member of copper or aluminum, the movement of which controls the actuation of a controlling member 18. This member may be a contact controlling member arranged to close contacts in one position and to be biased from this position against a suitable stop by a light spring 19 sufficient to insure the opening of the member if the associated device is not energized.

For the purpose of shock absorption in both directions of the movement of the controlling member 18, a slip clutch such as shown, for example, in Fig. 2, may be provided between the member 18 and the shaft 170 which carries the current conducting member 17. As shown, this clutch comprises a shouldered collar 171 which is suitably secured to the shaft 170 and on which is slidably mounted the member 18 so as to be rotatable relatively to the shaft. The amount of friction between the collar 171 and the member 18 can be controlled by the amount of compression in a spring 172 which is retained between the member 18 and an adjustably positioned collar 173. The collars 171 and 173 may be of insulating material in cases where a lead-in is brought to the member 18. With this arrangement, the possibility of contact rebounding in both directions is greatly reduced.

The starting unit 9 includes a potential winding which, as shown, comprises four series-connected coils 20 arranged on the outer rim of the stator 11. This potential winding is connected to be energized in accordance with the voltage $E_{23}$ across the phase conductors 2 and 3 through suitable means such as a potential transformer 21 connected to the polyphase bus 4. In order to provide a voltage amplifying action so as to insure effective operation at low voltages, there may be provided a non-linear resonant circuit means, which, as shown, comprises a voltage breakdown device 22 connected across the windings 20 and a capacitance device such as a condenser 23 in series with the windings 20. The device 22 may be a neon lamp which is conductive at normal voltage to provide a conducting path in parallel with the winding 20 but is nonconductive at low voltage so that the winding receives the full voltage of the potential transformer 21. The salient 15 of the starting unit 9 carries a winding 24, which is connected to be energized in accordance with the current $I_3$ in the phase conductor 3 of the circuit to be protected through suitable means such as a current transformer 25. It will be obvious to those skilled in the art that the winding 24 may be provided with taps for pick-up adjustment purposes. The windings 20 and 24 provide a directional torque on the rotor 17 which is proportional to $EI \cos(\phi-\theta_1)$, where E and I are the voltage and current of the phase 2—3 at the station bus 4, $\phi$ the power factor angle of the circuit, and $\theta_1$ the angle between E and I for the maximum sensitivity or torque of the starting unit. It will be obvious from the expression above that the torque is a directional torque.

In order to obtain the desired distance response characteristic, the starting unit 9 includes another potential winding 26 positioned on the salient 13. The potential windings 20 and 26 co-operate to produce a torque proportional to $E^2$ which acts in a direction to hold the contact controlling member 18 in the circuit opening position. It will also be obvious to those skilled in the art that the magnitude of this torque can be controlled by means of taps whereby to vary the number of turns in use in the winding.

The resultant torque on the rotor 17 in the direction to effect a circuit closing action of the circuit controlling member 18 is then, $$EI \cos(\phi-\theta_1) - K_1 E^2$$

$K_1$ being a constant. At the balance point of the device, the two torques represented by the two terms in this expression will be equal in magnitude and from this equality, there is derived the expression $$\frac{I}{E} = \frac{K_1}{\cos(\phi-\theta_1)}$$

In other words, the starting unit 9 operates to close its contacts when the admittance $$\frac{I}{E}$$

exceeds $$\frac{K_1}{\cos(\phi-\theta_1)}$$

and when $\cos(\phi-\theta_1)$ is positive. This can be expressed in the form of an impedance response characteristic, $$Z_1 = \frac{\cos(\phi-\theta_1)}{K_1}$$

The ohm unit 10 responds to the reactance of the protected circuit. For this purpose, the ohm unit may comprise a current winding shown as including four coils 27, 28, 29, and 30 on the outer rim of the stator 11. These may be connected in series and energized in accordance with the current in one of the phase conductors of the circuit 1—2—3. However, in order to have the same reactance response for all faults at a given point whether two or more phase conductors are involved, these coils may be energized to provide a current energization I, which is equal to the vectorial difference between the currents in two phase conductors of the circuit. Thus, the coils 27 and 29 may be energized from a current transformer 31 in the phase conductor 2 and the coils 28 and 30 from the current transformer 25 in the phase conductor 3, the coils being so arranged that the flux they produce in the salients 12 and 14 is dependent on the difference between the currents $I_2$ and $I_3$ in the phase conductors 2 and 3. In addition to the current energized winding, there is another winding comprising series-connected coils 32 on the salients 13 and 15. In accordance with my invention, the energization of these coils is dependent on the difference between a voltage of the circuit 1—2—3 at the station bus 4 and a voltage which is substantially equivalent to the voltage of this circuit for a short circuit at that remote point of the circuit for which operation of the ohm unit is desired. For this purpose, the coils 32 may be connected across the phase 2—3 of the potential transformer 21 through an auto-transformer 33 connected to be energized from a high reactance transformer 34 which provides the desired reactance equivalent drop. When it is desired to use the difference between the currents of two phase conductors, the transformer 34 is provided with two primary current windings 35 and 36, which in the arrangement shown are respectively connected to be energized from the current transformers 25 and 31, or in other words in accordance with the currents in the phases adjacent the delta phase that is being protected. The high reactance transformer 34 provides a ready means for getting the desired reactance voltage drop to match the voltage of the circuit for the selected balance or operating point and moreover reduces the burden on the current transformers. Suitable taps on the auto-transformer 33 provide a wide range of operating reactance values for the ohm unit and also facilitate close adjustments whereby to obtain a high degree of selectivity in response. Inasmuch as the ohm unit winding 32 is energized by the difference between a voltage of the line at the station and a voltage obtained from the high reactance transformer 34, variation in line frequency tends to have no effect on the balance between these two voltages because both are varied in the same ratio. Hence, there is substantially no change in the distance point at which operation of the ohm unit occurs, or, in other words, the amount of inductance at which the relay will function tends to remain substantially constant.

In order to have the power factor of the circuit of the coils 32 unity so as to obtain the desired reactance characteristic, I connect suitable means such as a condenser 37 in the circuit. On the face of it, the simplest thing to do would be to have the condenser 37 equal in capacitive reactance to the inductive reactance of the circuit, which would provide a resonant circuit. Such an arrangement, however, introduces problems in manufacturing because, by reason of tolerated variations in relay structure due to manufacturing conditions, it is difficult from an economic standpoint always to have the precise condenser value for resonance at the power circuit frequency in order to obtain a unity power factor circuit so as to operate on reactance. Moreover, variable condensers which theoretically would compensate for a lack of uniformity in relay coil structure and other factors are not practicable. Furthermore, even though the theoretically desired resonance condition were simply obtainable, mere variation in the power circuit frequency would result in frequency errors sufficient to affect the proper functioning of the ohm unit. Also, slight variations in condenser capacity can produce undesirable changes in accuracy in response of the ohm unit and thus greatly increase the probability of false operation due to transients occurring at the moment the short-circuit occurs or when a short-circuit is cleared. In order to eliminate these disadvantages, I provide, in accordance with my invention, an adjustable resistor 38 in parallel with the condenser 37. Thus, for any given potential winding 32, the resistance 38 lessens the amount of capacitance needed to provide unity power factor and at the same time provides a parallel damping circuit, thereby tending to diminish or limit the transients and insure accuracy of response of the ohm unit. The circuit of the winding 32 can be so arranged that the remanent transient torque is in the contact opening direction.

In view of the connections described, it will be obvious that the energization of the winding 32 is proportional to $K_2(I_2-I_3)X - E_{23} \sin \phi$, where $K_2$ is a constant, X is the reactance setting of the relay, and $\phi$ the angle between the voltage and the current of the circuit. Considering the energization of the windings 32 in conjunction with the current windings 27, 28, 29, and 30, the torque of the ohm element on its rotor 17 in a direction to close its contacts is $K_2(I_2-I_3)^2 X - E_{23}(I_2-I_3) \sin \phi$. At the balance point, $$E_{23}(I_2-I_3) \sin \phi = K_2(I_2-I_3)^2 X,$$

or, in terms of its reactance response, $$X = \frac{E_{23} \sin \phi}{K_2(I_2-I_3)}$$

In other words, the ohm unit closes its contacts when the reactance of the circuit to the point of fault is less than the value X and sin $\phi$ is plus, $K_2$ being controllable by the tapped potential transformer 33. Obviously, the above expression for X can be reduced to the general or more simple form $$X = \frac{E \sin \phi}{KI}$$

where K is a constant and E and I represent the desired circuit current and voltage necessary to give the desired reactance response. Any tendency, that a change in taps on this transformer has to affect the power factor of the circuit of the coils 32, can be approximately compensated by a condenser 39 of relatively small capacity which can be connected to different taps to give a variable condenser effect.

In order to provide a stepped time-distance characteristic such that the circuit breaker 5 may be tripped substantially instantaneously for all faults within the section of the circuit 1—2—3 between the bus 4 and the next adjacent station for all faults up to a given percentage of length, for example, 90% of the protected line section extending from the bus 4 and a time delay tripping for faults beyond this point and over a predetermined range of distance in the next section and a still greater time limit for tripping to take care of conditions which may arise due to failure of some particular relay, there are provided a timing unit 40 and means such as a transfer relay 41 for automatically varying the reactance setting of the ohm unit 10. The timing unit includes an electromagnetic motor unit 42 which, when energized, stores energy in a spring 43. This energy is released through an escapement mechanism 44 to actuate a movable contact 45 to engage different sets of adjustably positioned contacts 46, 47, after a time delay dependent upon the positioning of these contacts and the initial position of the movable contact 45. The transfer relay 41 is provided to change the ohmic setting of the ohm unit so that with only one ohm unit two or more reactance settings may be provided. For this purpose, the transfer relay 41 is in effect a double-pole double-throw device arranged when energized to close contacts 48 and 49 and when de-energized to close contacts 50 and 51. This relay is also provided with another set of contacts 52 which are arranged to be closed when the relay 41 is energized. The arrangement is such that both the timing unit 40 and the transfer relay 41 are under the control of the starting unit. Normally, both the timing unit and the transfer relay are connected in a closed circuit which is energized from a suitable source such as the battery 53. This circuit includes a conductor 54, the winding 42 of the timing unit 40, conductors 55, 56, and 57, the winding of the transfer relay 41, conductors 58 and 59 and the battery 53. Normally, enough current will flow in the circuit to pick up the transfer relay 41, but not to operate the timing unit 42. When the controlling member 18 of the starting unit 9 closes its contacts 60, the winding of the transfer relay 41 is short-circuited and enough current can flow in the circuit of the winding 42 of the timer to effect the operation thereof. The contacts 60 of the starting unit may be protected by suitable arc-quenching means such as a resistor 61 and a condenser 62 connected across them. The short-circuit of the winding of the transfer relay 41 retards the decay of the flux in the magnetic circuit so that this relay drops out with a time delay which is less than the intermediate time setting; that is, the time that it takes the contacts 45 of the timing unit 40 to close its contacts 46.

The ultimate tripping control action may be accomplished by an auxiliary seal-in relay 63 whose contacts can more readily handle the current closing requirements of the trip coil 6 and also, when once operated, definitely maintains the circuit of the trip coil closed even though there should be some tendency to open of the contacts of the starting and ohm units.

Assuming the parts positioned as shown in the drawing, and that a fault occurs on the circuit 1—2—3 within the instantaneous tripping zone range, then the circuit controlling members 10 of the starting unit and ohm unit close their respective contacts 60 and 64. The closing of the contacts 60 short-circuits the transfer relay 41, which drops out with a time delay. The circuit of the seal-in relay 63 is completed as follows: Battery 53, conductor 59, contacts 60 of the starting unit, conductor 56, contacts 64 of the ohm unit, conductor 65, contacts 52 of the transfer relay which are not yet opened, conductor 66, winding 67 of an instantaneous trip target indicating device, conductor 68, winding of the seal-in relay 63, auxiliary switch 7 of the circuit breaker 5 and conductor 69. The operation of the seal-in relay 63 closes the circuit of the trip coil 6 as well as completing its own circuit to maintain itself energized until such time as its circuit is opened at the auxiliary switch 8 of the circuit breaker when the circuit breaker opens.

If the fault is beyond the instantaneous zone of the circuit, then the reactance of the circuit to the fault is too high for the ohm unit to close its contacts. Consequently the transfer relay 41 drops out to open its contacts 48, 49, and 52, and to close its contacts 50 and 51. Thus, when the transfer relay operates, it first prevents any further tripping operation from the instantaneous setting of the ohm unit by opening its contacts 52 and then immediately changes the setting of the ohm unit to a reactance value which covers the intermediate zone. In the meantime, the timing unit 40 has been moving its contact operating member 45 toward the contacts 46. If, when the timing unit contacts 46 are closed, the ohm unit contacts 64 are also closed, the seal-in relay 63 will be energized in a trip circuit as follows: Battery 53, conductor 59, contacts 60 of the starting unit, conductor 56, contacts 64 of the ohm unit, conductor 70, contacts 46 of the timing unit, intermediate zone trip indicating target device 71, conductor 68, winding of the seal-in relay 63, circuit breaker auxiliary switch 7, and conductor 69 to battery 53.

If the fault is beyond the intermediate zone so that the circuit reactance to the fault is too high for the ohm unit to close its contacts and the starting unit contacts 60 remain closed until the contact operating member 45 of the timer 40 engages contacts 47, the circuit of the seal-in relay 63 will be completed as follows: Battery 53, conductor 59, contacts 60 of the starting unit, conductor 56, contacts 47 of the timing unit, winding 72 of the back-up zone trip indicating target device, conductor 68, winding of the seal-in relay 63, circuit breaker auxiliary switch 7, and conductor 69 to the battery 53. In other words, if a relay in any section fails to trip instantaneously or in intermediate time, then the relay in the adjacent section will operate in the back-up time to disconnect its own section and thereby separate the faulty section from the system at that end.

In order to simplify the illustration of my invention, I have shown a protective arrangement for only one phase of the system, but it will be obvious to those skilled in the art that in order to obtain complete protection for a three-phase system, for example, three distance relays, each embodying a starting unit, an ohm unit, and a timing unit, together with their appurtenances, will be required. Moreover, the connections of these devices will be obvious by analogy from the illustration shown for the protection of the phase 2—3.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an alternating current circuit, means for interrupting said circuit, and means for controlling the operation of said circuit interrupting means including a distance responsive relay device having a plurality of cooperating windings, means for energizing one of said windings in accordance with a current of the circuit and another of said windings in accordance with the difference between a voltage of the circuit at a given point and a voltage which is substantially equivalent to the reactive voltage of the circuit for a fault at that remote point of the circuit for which operation of the relay device is desired.

2. In combination, an alternating current circuit, means for interrupting said circuit, and means for controlling the operation of said circuit interrupting means including a relay device having electromagnetic means, means for energizing said electromagnetic means in accordance with the difference between the currents in two phase conductors of the circuit and also in accordance with the difference between a voltage of the circuit and a voltage substantially equivalent to the reactive voltage of the circuit for a fault at that remote point of the circuit for which operation of the device is desired.

3. In combination, an alternating current circuit, means for interrupting said circuit, and means for controlling the operation of said circuit interrupting means including a relay device having a plurality of cooperating windings, means for energizing one of said windings in accordance with a current of the circuit and another of said windings by a voltage proportional to $IX - E\sin\phi$, $E$ and $I$ being a voltage and a current of the circuit, $\phi$ the power factor angle between $E$ and $I$, and $X$ the reactance of a predetermined portion of the circuit.

4. In combination, an alternating current circuit, means for interrupting said circuit, and means for controlling the operation of said circuit interrupting means including a distance responsive relay device having current and voltage windings, means for energizing said windings from said circuit, and means for establishing unity power factor in the circuit of said voltage winding comprising a condenser and a resistance in parallel with each other and in series in said voltage winding circuit, said resistance being proportioned to prevent oscillations in said voltage winding circuit.

5. In combination, an alternating current circuit, means for interrupting said circuit, and means for controlling the operation of said circuit interrupting means including a distance responsive relay device having current and voltage windings, means for energizing said windings from said circuit and means for establishing a predetermined power factor angle for the circuit of said voltage winding whereby to control the angle of maximum effective response of the relay device comprising a condenser and a resistance connected in parallel with each other and in series with the circuit of said voltage winding, said resistance being proportioned to prevent oscillations in said voltage winding circuit.

6. In combination, an alternating current circuit, means for interrupting said circuit, and means for controlling the operation of said circuit interrupting means including a distance responsive relay device having current and voltage windings, means for energizing said windings from said circuit, and means for establishing unity power factor in the circuit of said voltage winding comprising a condenser and a resistance in parallel with each other and in series with said voltage winding.

7. In combination, an alternating current circuit, means for interrupting said circuit, and means for controlling the operation of said circuit interrupting means including a distance responsive relay device having current and voltage windings, means for energizing said windings from said circuit and means for establishing a predetermined power factor angle for the circuit of said voltage winding whereby to control the angle of maximum effective response of the relay device comprising a condenser and a resistance connected in parallel with each other and in series with the circuit of said voltage winding.

8. In combination, an alternating current circuit, means for interrupting said circuit, and means for controlling the operation of said circuit interrupting means including a distance responsive relay device having a current winding and a voltage winding, means for energizing said current winding in accordance with a current derived from said circuit, means for energizing said voltage winding in accordance with the difference between a voltage of the circuit and a voltage derived from a current of the circuit, and means for obtaining said derived voltage including a current transformer in said circuit and a high reactance transformer connected to be energized from said current transformer.

9. In combination, an alternating current circuit, means for interrupting said circuit, means for controlling the operation of said circuit interrupting means including a distance responsive relay device having a current winding and a voltage winding, means for energizing said current winding in accordance with a current derived from said circuit, means for energizing said voltage winding in accordance with the difference between a voltage of the circuit and a voltage derived from a current of the circuit, means for obtaining said derived voltage including a current transformer in said circuit and a high reactance transformer connected to be energized from said current transformer, and means for varying the amount of said voltage applied to said voltage energized winding including a tapped auto-transformer whereby to control the distance response action of said relay device.

10. In combination, an alternating current circuit, means for interrupting said circuit, means for controlling the operation of said circuit interrupting means including a distance relay having a starting unit and an ohm unit, each provided with current and voltage windings, means for respectively energizing the windings of the starting unit in accordance with a current and a voltage of the circuit, means for respectively energizing the current and voltage windings of the ohm unit in accordance with a current of said circuit and in accordance with the difference between a voltage of the circuit and a voltage derived from a current of the circuit, means for deriving said last-named voltage, and means controlled by said starting unit for controlling the proportion of said last-named voltage applied to the voltage winding of the ohm unit.

11. In combination, an alternating current circuit, means for interrupting said circuit, means for controlling the operation of said circuit interrupting means including a distance responsive relay device having current windings and a voltage winding, means for energizing said current windings from said circuit to effect the energization of said device in accordance with the difference between the currents in two phase conductors of the circuit, means for energizing said voltage winding in accordance with the difference between the voltage across said phase conductors and a voltage derived from the difference between the currents in said two phase conductors, and means for varying said derived voltage whereby to control the distance responsive action of said relay device.

12. In combination, an alternating current circuit, means for interrupting said circuit, means for controlling the operation of said circuit interrupting means including a distance relay having a starting unit and an ohm unit, each provided with current and voltage windings, means for respectively energizing the windings of the starting unit in accordance with a current and a voltage of the circuit, means for respectively energizing the current and voltage windings of the ohm unit in accordance with a current of the circuit and in accordance with the difference between a voltage of the circuit and a voltage derived from a current of the circuit, means for obtaining said derived voltage including a current transformer in said circuit and a high reactance transformer connected to be energized from said current transformer, a tapped auto-transformer connected to said high reactance transformer, and means controlled by said starting unit for controlling the connection of said voltage winding to different taps of said auto-transformer whereby to control the distance responsive action of said relay device.

13. In combination, an alternating current circuit and means for controlling said circuit including an electroresponsive device having a movable member, a circuit controlling member actuated by said movable member and movable relatively thereto, and means for actuating said movable member including a winding connected to be energized from said circuit, and damping means for preventing oscillations in the circuit of said winding.

14. In combination, an alternating current circuit and an electroresponsive device comprising a winding connected to be energized from said circuit, and means for preventing oscillations in the circuit of said winding comprising a condenser and a resistance in parallel with each other in the circuit of said winding.

15. In combination, an alternating current circuit and means for controlling said circuit including a relay having a winding connected to be energized in accordance with the difference between two voltages derived from said circuit, said relay being operative when said voltage difference is substantially zero, and means for deriving said voltages whereby to maintain the operative response of said relay constant independently of frequency variation in said alternating current circuit.

16. Means for controlling an alternating current circuit including an electro-responsive device having a movable member, a circuit-controlling member actuated by said movable member and movable relatively thereto, and means for actuating said movable member including a winding adapted to be energized from the circuit to be controlled and damping means for preventing oscillations in the circuit including said winding.

17. An electro-responsive device comprising a winding adapted to be energized from an alternating current circuit, and means for preventing oscillations in the circuit including said winding comprising a condenser and a resistor in parallel with each other in the circuit of the winding.

OLIVER C. TRAVER.